United States Patent [19]

Hodge

[11] 4,169,656
[45] Oct. 2, 1979

[54] FIBER OPTIC INTERFACE FOR COMBINED SIGNAL TRANSMISSION AND DETECTION

[75] Inventor: Malcolm H. Hodge, Claymont, Del.

[73] Assignee: TRW Inc., Los Angeles, Calif.

[21] Appl. No.: 838,333

[22] Filed: Sep. 30, 1977

[51] Int. Cl.² .............................................. G02B 5/14
[52] U.S. Cl. ............................... 350/96.15; 350/96.20
[58] Field of Search ............... 350/96.15, 96.21, 96.16, 350/96.18, 96.20

[56] References Cited

U.S. PATENT DOCUMENTS

| | | | |
|---|---|---|---|
| 3,885,859 | 5/1975 | Dalgleish | 350/96.21 |
| 3,936,143 | 2/1976 | Sato | 350/96.21 |
| 3,948,582 | 4/1976 | Martin | 350/96.21 |
| 3,950,075 | 4/1976 | Cook et al. | 350/96.21 |
| 4,021,099 | 5/1977 | Kawasaki et al. | 350/96.18 |
| 4,047,796 | 9/1977 | Kao et al. | 350/96.21 |
| 4,053,764 | 10/1977 | Sicrak et al. | 350/96.15 |
| 4,076,375 | 2/1978 | Muska et al. | 350/96.15 |

FOREIGN PATENT DOCUMENTS 469188   11/1974   Australia .............................. 350/96.15

OTHER PUBLICATIONS

Fujita et al., "Optical Fiber Wave Splitting Coupler," Applied Optics, vol. 15, No. 9, Sep. 1976.
"European News—Optical Fibers are Branching Out," Electro—Optical System Design, p. 14, Sep. 1977.

*Primary Examiner*—John K. Corbin
*Assistant Examiner*—Stewart Levy
*Attorney, Agent, or Firm*—Neuman, Williams, Anderson & Olson

[57] ABSTRACT

A fiber optic interface for combined signal transmission and detection is provided. The interface enables transmission in two directions over a single optic fiber and includes a housing having an elongated channel extending therethrough. The housing is comprised of a transparent material. A first optic fiber is secured in one end of the channel with the outermost end of the first optic fiber being aligned with a light source. A second optic fiber is secured in the other end of the channel with the innermost end of the second fiber being disposed adjacent the innermost end of the first fiber. The ends of the fibers are mismatched so that there is a loss of light passed from at least the second fiber to the first fiber during a light transmission from the second to the first fiber. A light sensitive device is secured to the housing and is responsive to light escaping at the junction between the first and the second fiber ends. The mismatching of the fiber ends is accomplished in two ways. The first is the provision of a smaller diameter optic fiber which is connected to the light source than the optic fiber connected to the remote light source. In this way substantially all of the light provided by the light source connected to the first optic fiber is passed to the optic fiber connected to a remote light source. However, in a transmission from the remote light source to the local interface, there is a loss of light about the periphery of the first optic fiber which enables the detection device to pick up the signal.

11 Claims, 6 Drawing Figures

FIBER OPTIC INTERFACE FOR COMBINED SIGNAL TRANSMISSION AND DETECTION

This invention relates generally to fiber optic couplers and more particularly to a fiber optic interface for combined signal transmission and detection which enables two way transmission over a single optical fiber.

In prior systems where data has been transmitted in two directions over optical fibers, at least two optical fibers have been used. In such systems the two optical fibers run parallel to each other with one end of the fibers being connected to a light emitter and a light detector and at the opposite end of the optical fibers the optical fiber connected to the light emitter at the first end is connected to a light detector at the opposite end and vice versa for the second optical fiber.

When the optical fibers are parts of fiber bundles of macroscopic proportions and it is necessary to arrange half of the fibers to be connected to a detector and half of the fibers to be connected to a light emitter at one end and at the opposite end to connect the fibers that are connected to the light emitter to a detector at the second end and vice versa, not only is there a problem with the large cross-sectional requirement of all of the optical fibers, but there is the further difficulty of identifying the fibers in the bundle for correct registration.

In many mass applications, the efficiency of light transmission from the light source to the light detector over optical fibers is not required and yet space requirements and registration difficulties represent a great problem and therefore have prevented the utilization of optical fibers for signal transmitting therein.

It is therefore an object of the invention to provide an interface which enables combined signal transmission and detection over a single optic fiber.

Still another object of the invention is to provide a new and improved fiber optic interface for a combined signal transmission and detection which is inexpensive to manufacture.

Yet another object of the invention is to provide a new and improved fiber optic interface for combined signal transmission and detection which utilizes light loss at the interface between two optic fibers to enable transmission in two directions over a single optical fiber.

These and other objects of the invention are achieved by providing a new and improved fiber optic interface for combined signal transmission and detection. The interface includes a housing having an elongated channel which extends therethrough. The housing is preferably comprised of glass or other transparent material and includes a first optic fiber which is secured in one end of the channel with the outermost end of the first optic fiber being aligned with a light source. A second fiber is connected in the other end of the channel with the innermost end of the second fiber being disposed adjacent the innermost end of the first fiber. The ends of the fiber are mismatched so that there is a loss of light passed from at least the second fiber to the first fiber during a light transmission from the second to the first fiber. A light sensitive device is secured to the housing and is responsive to the light escaping at the junction between the first and second fiber ends during a transmission from the second to the first fiber and thereby enables receipt of a signal over said optical fiber.

Other objects and many of the attendant advantages of the instant invention will be readily appreciated as the same becomes better understood by reference to the following detailed description when considered in connection with the accompanying drawing, wherein.

Referring now in greater detail to the various figures of the drawing wherein like reference numerals refer to like parts, a fiber optic interface embodying the invention is shown generally at 20.

The interface 20 basically comprises a housing formed of three rods 22, 24 and 26 which are of generally cylindrical shape and which include tapered ends 28 at each end of the rods.

Figure 1:
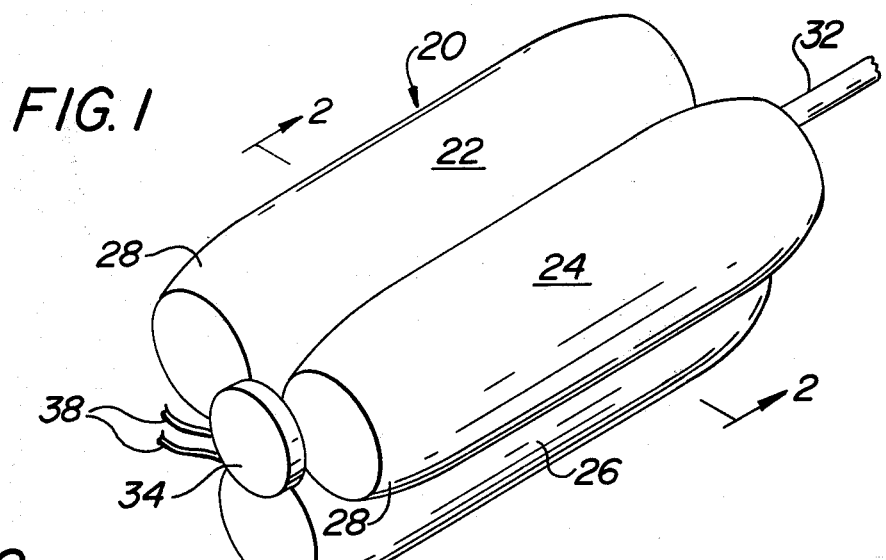
FIG. 1 is a perspective view of a fiber optic interface embodying the invention.
Figure 2:
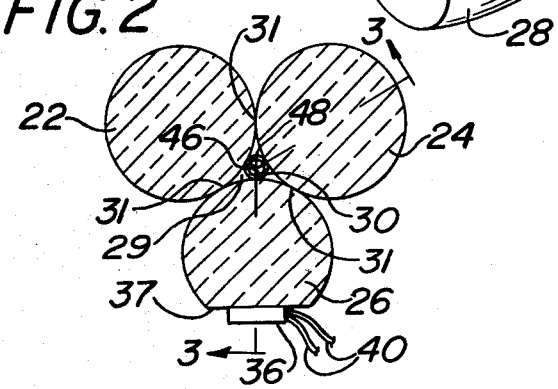
FIG. 2 is a sectional view taken along the line 2—2 in FIG. 1.
Figure 5:
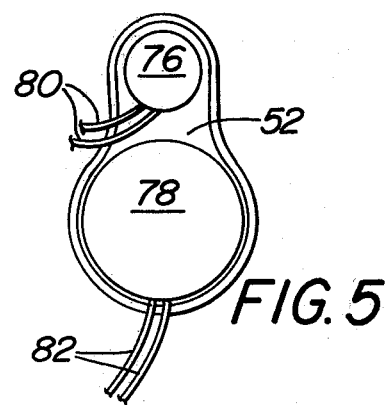
FIG. 5 is a front elevational view of the alternate fiber optic interface.

The rods 22, 24 and 26 are preferably formed of glass and the housing is formed by drawing the heated glass rods whereby the rods are integrally secured to each other at the junctions along their periphery as shown in FIG. 2 at 31.

Figure 3:
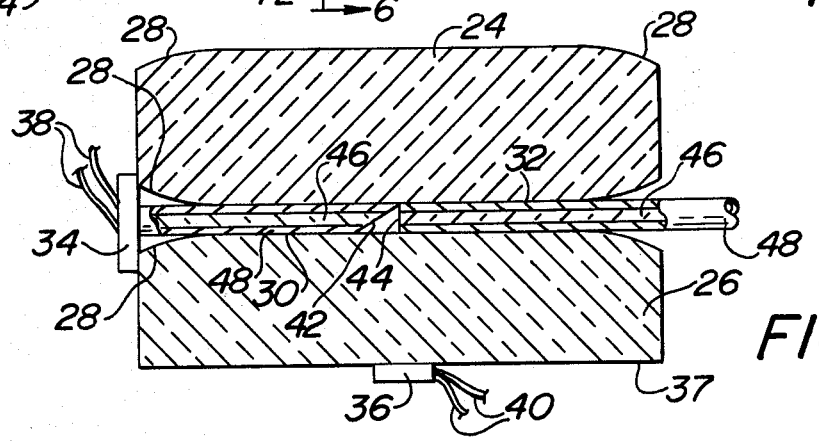
FIG. 3 is a sectional view taken along the line 3—3 in FIG. 2.

It should be understood that the housing may also be made of more than three rods An interstitial channel 29 is formed between the three rods as shown in FIG. 2. As best seen in FIG. 3, a first optic fiber 30 is secured in the interstitial channel at one end of the housing formed by the rods 22, 24 and 26. A second optic fiber 32 is secured in the other end of the channel 29 with the ends of the optic fibers 30 and 32 being secured adjacent to each other.

As best seen in FIG. 3, the tapered ends 28 of the rods enable a smooth enlarged opening at each end of the interstitial channel 29 which facilitates the insertion of the optic fibers 30 and 32.

A light emitting diode 34 is secured to the outermost end of the optic fiber 30 and the lateral ends of the rods 24, 26 and 28. The light emitting diode is preferably secured by a suitable adhesive with the light emitting diode being closely aligned with the core of the optic fiber 30 to maximize the light transmission to the optic fiber 30 from the light emitting diode 34.

A light sensitive device 36 is provided which preferably comprises a photodetector.

The photodetector is preferably secured to a flat side 37 which is provided on the outer periphery of rod 26. The light sensitive device 36 is provided as close to the junction between the ends of optic fibers 30 and 32 as is possible.

The light emitting diode 34 is connected via wires 38 to circuitry which is utilized for providing signals to the light emitter 34. Similarly, the light detector 36 is connected to circuitry via wires 40. As can be seen in FIG. 3 the junction between the ends 42 and 44 is mismatched as a result of the end of optic fiber 30 having an inclined end 42 whereas the end 44 of optic fiber 32 extends perpendicular to the axis of the optic fiber 32. Thus, when light is emitted from diode 34 and is transmitted into the optic fiber 30 only a portion of the light is transmitted to optical fiber 32. The remaining portion of the light transmitted in that direction is reflected into the housing formed of rods 24, 26 and 28 and such light is picked up by the device 36. By suitable electronic circuitry, light sensitive device 36 is disabled when emitter 34 is operating.

That is, by conventional techniques light sensor 36 is turned off each time the light emitting diode 34 is turned on. Another technique which may be used where simultaneous transmission in both directions is desired is to provide the signal on optic fiber 30 from light emitting diode on a carrier signal at a frequency different than the frequency that light sensitive device 36 is capable of receiving. This is accomplished by a conventional filter or tuner.

The portion of the signal which is passed from optic fiber 32 is transmitted to a remote location by optic fiber 32 which extends thereto.

It should be noted that optic fibers 30 and 32 may be made of either plastic or glass and optic fibers 30 and 32 each includes a core 46 and a cladding of a different refractive index 48. It can therefore be seen that a simple interface is provided which enables signal transmission over a single optic fiber 32 in two direction.

The junction at the ends 42 and 44 of the fibers 30 and 32, respectively, causes a considerable amount of light loss thereat which can easily be tolerated in most mass applications of fiber optics. Thus, considerable savings can be accomplished by enabling simple installation of only a single optic fiber and thus no registration problems are encountered when installing the same. It should be understood that a similar interface is provided at the opposite end of fiber optic 32 which is used to both transmit and receive signals at the other end of the optic fiber.

Figure 4:
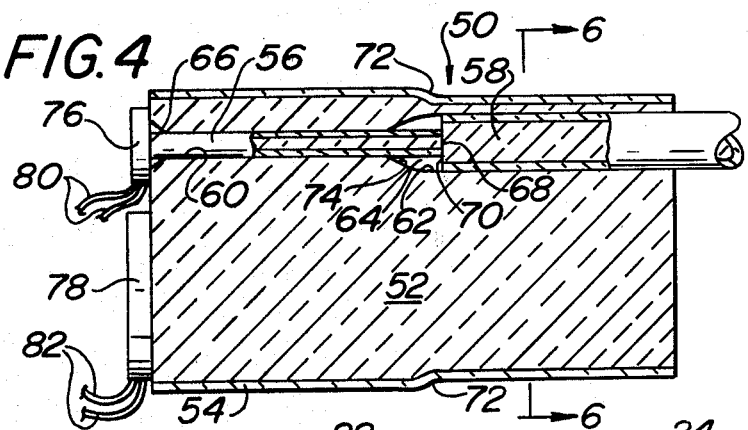
FIG. 4 is a vertical sectional view with portions shown in full for purposes of clarity of an alternate fiber optic interface embodying the invention.
Figure 6:
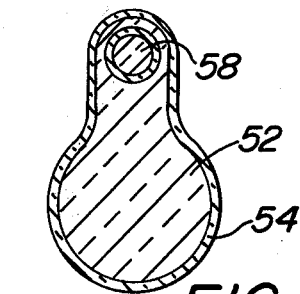
FIG. 6 is a sectional view taken along lines 6—6 in FIG. 4.

An alternate fiber optic interface embodying the invention is shown at 50 in FIG. 4.

The interface 50 basically comprises a housing 52 which is preferably comprised of glass and which includes a glass coating 54 which extends about the longitudinal periphery thereof. The glass coating is preferably of a different light refractive index so that the light is required to escape through the lateral end at which a photosensitive device is secured to the housing 52.

A longitudinally extending opening is provided which extends through the housing 52. A first fiber optic 56 is secured in said longitudinally extending opening 60 at one end of the housing 52. A second optic fiber 58 is provided at the opposite end of the opening and this optic fiber extends out to a remote location and is secured adjacent to the optic fiber 56.

Opening 60 which extends through the housing 52 is enlarged at the end in which optic fiber 58 is disposed so that a larger diameter optic fiber 58 can be used in conjunction with the smaller diameter optic fiber 56.

Optic fiber 56 has a first end face 66 which is aligned with the lateral wall of housing 52 and a second end 68 which is abutted against the core of the optic fiber 58. Optic fiber 58 has an end wall 70 which abuts the wall 56 in substantially tangential and intimate contact so that light emitted through optic fiber 56 and passed through optic fiber 58 occasions very little loss at the junctions therebetween.

The housing 52 is preferably formed by drawing a glass rod, cutting the rod at a predetermined length and then providing an opening 60 extending longitudinally through the housing. The end which accommodates the larger diameter fiber is dipped into an acid bath, such as hydrofluoric acid, to etch away or taper the end of the housing 62. This also causes the opening 60 to be enlarged to the diameter at portion 62 thereof. Thus, the outer diameter of the housing 52 can be seen to be reduced at 72. Also, the opening 60 is flared at 74 to the larger diameter portion 62.

At the end 66 of fiber optic 56 a light emitting diode 76 is secured with the light emitting portion being aligned with the core of the optic fiber 56 for maximum efficiency of light transmission to the optic fiber 56.

Directly below the light emitting diode 76 there is provided a light sensitive device which preferably comprises a photodetector 78 which acts to sense the light which is lost at the junction between the optic fiber 56 and optic fiber 58.

The photodetector 78 is suitably secured to the end wall of the housing 52 adjacent the light emitting diode 76 and is suitably secured thereto by an adhesive.

The light emitting diode 76 is connected to suitable circuitry via electric lines 80 and the light sensitive device 78 is connected by suitable electric lines 82 to circuitry.

The optic fiber 56 is preferably secured within the housing by a suitable adhesive between the outer periphery of the fiber 56 and the surface of opening 60. Similarly, the end of optic fiber 58 is suitably adhesively secured in intimate contact with optic fiber 56 by suitable adhesive securement of the optic fiber 58 with the walls of portion 62 of opening 60.

The intimate contact between the optic fibers 56 and 58 causes substantially no transmission loss from fiber 56 to fiber 58. Therefore, by providing in cavity 64 a liquid or solid having a strong absorbtion of wave lengths at the infra-red frequency at which the signal from light emitter 76 is provided, little of the loss of light from diode 76 is received by light sensitive device 78. The light absorbtive material may also be placed between the light sensitive device and the lateral wall of the housing 52 to prevent light at a predetermined wave length from being detected by the light sensitive device.

In the embodiment of FIG. 4, because there is substantially no loss in the transmitting direction of light from light emitting diode 76 through optic fiber 56 to optic fiber 58 at the junction between the two optic fibers, by providing a liquid which has a strong absorbtion of light at microwave lengths in the cavity 64 surrounding the junction between optic fiber 56 and 58, there can be simultaneous transmission in both directions without further electronic switching with respect to the interrelation between the light emitting diode and the light sensitive device 78.

For example, by providing a solution of triethylamine, which acts to absorb wave lengths of 0.9 microns, within cavity 64 and using a 0.9 micron wave length in light emitting diode 76, any leakage at the junction between optic fiber 56 and 58 will be absorbed by the triethylamine solution which prevents the signal from being picked up by the light sensitive device 78. The transmission of light in the opposite direction would not be affected if the light source at the remote end which is transmitted via optic fiber 58 is at an infra-red wave length of 0.8 microns, the signal is not absorbed by the triethylamine solution and is easily passed to the light sensitive device 78.

Similarly, a solution of ethanolamine can be provided in the cavity 64. The ethanolamine has a characteristic of absorbing wave lengths of 0.8 microns. With the ethanolamine the light transmitting from light emitting diode 76 would be at 0.8 microns while the remote light emitting diode would transmit at 0.9 microns since a 0.9 micron wave length would be easily transmitted through the ethanolamine and into the housing 52 which would be detected by the light sensitive device 78.

It can therefore be seen that a new and improved fiber optic interface for combined signal transmission and detection has been provided. Both embodiments enable data to be transmitted over a single optic fiber in two directions. Both embodiments enable the housing to be made from an inexpensive material. Furthermore, in both embodiments the housing is made from a material whose refractive index is tailored for maximum signal coupling.

Moreover, the fabrication technique of glass drawing which can be utilized for both housings lends itself to high production rates and is extremely suitable for the intended purpose.

Without further elaboration the foregoing will so fully illustrate my invention that others may, by applying current or future knowledge, readily adapt the same for use under various conditions of service.

What is claimed as the invention is:

1. A fiber optic interface for combined signal transmission and detection via first and second optic fibers, said interface including a separate housing body having an elongated channel extending therethrough, a light source and light sensitive means, said housing body comprising translucent material, said first optic fiber being secured in one end of said channel with the outermost end of said first optic fiber being aligned with said light source, said second optic fiber being in the other end of said channel, with the innermost end of said second fiber being disposed adjacent the innermost end of said first fiber, said light sensitive means being connected to said housing body, said ends of said fibers being arranged so that light passes between said first fiber and said second fiber and vice versa, and means for directing a portion of light to said light sensitive means during a light transmission from said second to said first fiber, said light sensitive means being responsive to said light portion directed thereto.

2. The fiber optic interface of claim 1 wherein the end of said first fiber extends at an angle to the axis thereof and the end of said second fiber is not parallel to the end of said first fiber so that intimate contact between the ends of said fibers is prevented, to thereby direct light into said body and to said light sensitive means.

3. The fiber optic interface of claim 1 wherein said housing body is comprised of a clear material and a coating of a different refractive index is provided about said housing to maximize light retention within the optic fibers reaching the light sensitive means.

4. The fiber optic interface of claim 1 wherein said housing is comprised of glass.

5. The fiber optic interface of claim 1 wherein a material having a light absorptive characteristic is provided between said junction of said first and second fibers and said light sensitive means.

6. The fiber optic interface of claim 1 wherein said housing comprises at least three rods which are secured together in a side-by-side parallel array with said first and second fiber being provided in the interstitial channel provided therebetween.

7. The fiber optic interface of claim 5 wherein one of said rods includes a flat surface along a longitudinal side thereof and said photosensitive means is secured thereto adjacent the junction between said first and second fiber.

8. The fiber optic interface of claim 1 wherein said body includes a cavity and wherein the ends of said first and second fibers are disposed in said cavity, said cavity including therein material which absorbs light of a specific wave length to enable light at said wave length escaping from said junction between said optic fibers to be absorbed by said material.

9. The fiber optic interface of claim 8 wherein said body is an elongated member having a first and second end face and wherein said light source and said light responsive means are secured to said first end face.

10. The fiber optic interface of claim 9 wherein said light responsive means encompasses a major portion of said first end face.

11. The fiber optic interface of claim 9 wherein said first fiber has a smaller diameter than said second fiber, said end of said first fiber being in intimate contact and aligned with said second fiber end so that substantially all of said light in said first fiber is transmitted to said second fiber, while a portion of said light in said second fiber is passed to said first fiber and the remainder of said light in said second fiber is passed into said housing and directed to said light sensitive means.

* * * * *